(12) United States Patent
Rodgers et al.

(10) Patent No.: US 7,834,757 B2
(45) Date of Patent: Nov. 16, 2010

(54) METHOD OF MOBILE STORAGE CONTAINER PROTECTION

(75) Inventors: Keith E. Rodgers, York, PA (US); Jack G. Landis, Wrightsville, PA (US)

(73) Assignee: Trailer Dog, LLC, Dover, PA (US)

( * ) Notice: Subject to any disclaimer, the term of this patent is extended or adjusted under 35 U.S.C. 154(b) by 448 days.

(21) Appl. No.: 11/680,928

(22) Filed: Mar. 1, 2007

(65) Prior Publication Data

US 2007/0205889 A1  Sep. 6, 2007

Related U.S. Application Data

(60) Provisional application No. 60/777,775, filed on Mar. 1, 2006.

(51) Int. Cl.
G08B 1/08 (2006.01)

(52) U.S. Cl. ............... 340/539.11; 340/431; 340/572.1

(58) Field of Classification Search ............. 340/539.1, 340/539.11, 539.13, 539.18, 539.24, 539.31, 340/425.5, 426.1, 540, 541, 506, 531, 572.1, 340/431; 701/213; 342/357, 457; 307/10.2
See application file for complete search history.

(56) References Cited

U.S. PATENT DOCUMENTS

| | | | |
|---|---|---|---|
| 5,144,661 A * | 9/1992 | Shamosh et al. ............ 340/540 |
| 5,563,453 A | 10/1996 | Nyfelt | |
| 5,682,133 A | 10/1997 | Johnson | |
| 6,028,537 A | 2/2000 | Suman | |
| 6,542,076 B1 | 4/2003 | Joao | |
| 6,559,620 B2 * | 5/2003 | Zhou et al. .................. 320/101 |
| 6,687,609 B2 | 2/2004 | Hsiao | |
| 6,847,892 B2 * | 1/2005 | Zhou et al. .................. 701/213 |
| 6,982,656 B1 | 1/2006 | Coppinger | |
| 6,983,202 B2 | 1/2006 | Sanqunetti | |
| 7,119,686 B2 | 10/2006 | Bertness | |
| 7,319,395 B2 * | 1/2008 | Puzio et al. ............. 340/572.1 |
| 7,339,477 B2 * | 3/2008 | Puzio et al. ............. 340/572.1 |
| 7,391,326 B2 * | 6/2008 | Puzio et al. ............. 340/572.1 |
| 7,492,255 B1 * | 2/2009 | Morris ....................... 340/541 |
| 2005/0248444 A1 | 11/2005 | Joao | |
| 2008/0186166 A1 * | 8/2008 | Zhou et al. ............. 340/539.13 |

* cited by examiner

*Primary Examiner*—Van T. Trieu
(74) *Attorney, Agent, or Firm*—Barley Snyder LLC

(57) ABSTRACT

Mobile storage trailers are often left unattended on construction sites. A mobile asset protection unit and method is utilized for a variety of interrelated purposes, including securing, managing, and tracking a single or fleet of non-self-propelled storage trailers. The method hereby details a means of tracking and accounting for a fleet of any type of mobile trailers. The mobile asset protection unit receives a distress signal from a variety of peripherals. The circuitry will immediately sound and alarm and/or relay the signal to the communications unit. The communications unit will notify the user via any one of a number of interfaces, including via cellular technology and/or internet technology. The user then relays a response to the distress signal that is in turn received and executed by the unit to ensure the protection of the storage trailer.

15 Claims, 4 Drawing Sheets

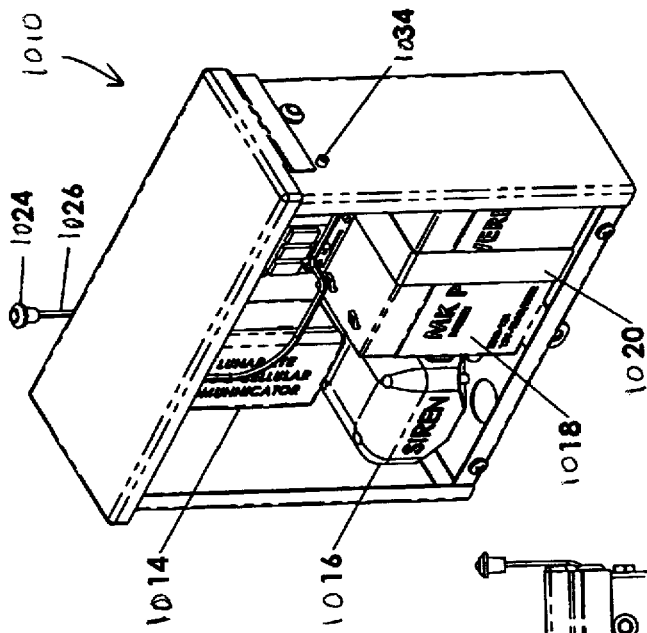
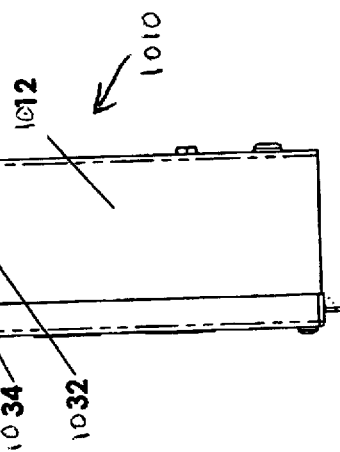
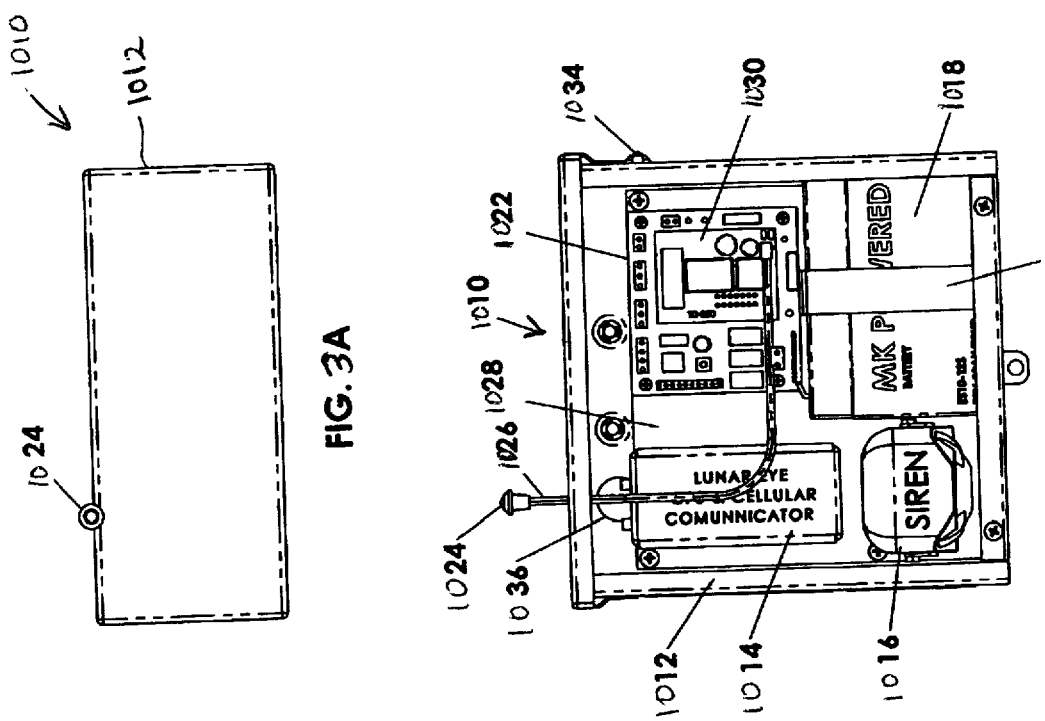
FIG. 3A  FIG. 3B  FIG. 3C  FIG. 3D

METHOD OF MOBILE STORAGE CONTAINER PROTECTION

CROSS REFERENCE TO RELATED APPLICATIONS

This non-provisional application claims the benefit of U.S. Provisional Application No. 60/777,775, filed Mar. 1, 2006.

FEDERALLY SPONSORED RESEARCH

Not Applicable.

SEQUENCE LISTING OR PROGRAM

Not Applicable.

BACKGROUND

Construction companies utilize storage trailers to house equipment while their workers are engaged on a job site. Thousands of these trailers are in use at any one time across the country and around the world. These trailers typically remain on the job site for the duration of the contract, stretching months or even years. Often times during the construction job the trailers are left unattended, whether it is at night, on weekends or holidays. Recently, theft of such trailers has become an increasing occurrence and continued nuisance to the owners of the trailers and the owners of the materials and valuable equipment kept on the job site in the trailers. A great deal of money is spent by these construction companies when thieves strike. This cost is subsequently passed on the customers.

Problems arise with existing technology in that less than optimal protection means are available to users. An immediate response is needed to ensure the asset is not permanently lost. Additionally, power must be constantly maintained to the container. It is further desired that the protection means should be easily accessed and controlled from any point on the globe.

Information relevant to attempts to address these problems can be found in U.S. Pat. Nos. 5,563,453, 5,682,133, 6,028,537, 6,542,076, 6,687,609, 6,983,202, and as well as published application number 2005/0248444. However, each one of these references suffers from one or more of the following disadvantages: (1) being easily thwarted by thieves; (2) not having a self-contained power source; (3) lacking an immediate response to the acts of a thief, and (4) lack the ability to be accessed and controlled from any position on the Earth.

For the foregoing reasons, there is a need for a more secure, immediately responsive protection unit that is accessible from all points on the Earth, while maintaining power without the presence of constant battery power.

SUMMARY

The present invention is directed to a method that satisfies this need of construction companies to provide a more secure, immediately responsive protection unit that is accessible from all points on the Earth, while maintaining power without the presence of constant battery power. The included method details a step-by-step process for the implementation of such a device. A mobile asset protection unit is simply one device that may be utilized to implement such a method and should not be construed as limiting the method to any such application. For example and as detailed herein, the mobile asset protection unit may be used for a variety of interrelated purposes, including securing, managing, and tracking a single or fleet of non-self-propelled storage trailers or containers. Such a protection unit may consist of any or all of the following components appropriate for the execution of the disclosed method: a circuit board acting as the central nervous system for the unit, a siren, sufficient power derived from any source (battery, solar panel, etc.) and a communications unit used to link the user with the protection unit.

The method disclosed herein will embody the following steps. First, the circuit board located with the protection unit receives a peripheral output signal. Such peripherals may include a means for low battery detection, a means for door proximity determination, a means for the determination of a geo-fence breach, a position determination means, and a motion detection means. The circuitry within the protection unit will analyze the output signal from the peripheral and make a determination as to which warning function is to be performed. Such immediate responses can include notifying the user, sending a signal to the monitoring system, and sending a signal to an internet website which is monitored by the user. The protection unit will transmit the appropriate response signal to the communications unit, which will in turn transmit the said signal to the user interface to alert user of potential breach of container and/or component malfunction. The user interface will receive the signal from said communications unit. The user will access this information and analyze the details from the protection unit to determine the appropriate response commands. The user will transmit the response command via said user interface. Subsequently, the communications unit receiving the response from the user and will dispatch these response commands to protection unit. The protection unit, via the circuit board located therein, will execute these response commands as ordered by the user.

When the user receives the message from the protection unit, the user may reply with a set number of responses, of those including: arm alarm, disarm alarm, activate siren, de-active siren, flash warning lights, and activate geo-fence.

Furthermore, as the protection unit executes the commands from the user, the protection unit will act in a set fashion. The alarm will be armed with the receipt of an arm alarm command, the alarm will be disarmed with the receipt of a disarm alarm command, the siren will sound with the receipt of an activate siren command, the siren will stop sounding with the receipt of a de-activate siren command, the warning lights will flash with the receipt of a flash warning lights command, or the geo-fence will activate with the receipt of an activate geo-fence command.

BRIEF DESCRIPTION OF THE DRAWINGS

The drawings presented hereafter are to be used together with the description and appended claims to explain the inventive aspects of the invention, and representative examples of the embodiments herein. The drawings are not to be construed as limiting the invention to only the illustrated and described embodiments. In the drawings, closely related figures have the same number but different alphabetic suffixes.

FIGS. 3A-D show top, perspective, front and side views of an embodiment of a mobile asset protection system.

REFERENCE NUMERALS IN DRAWINGS

Figure 1:
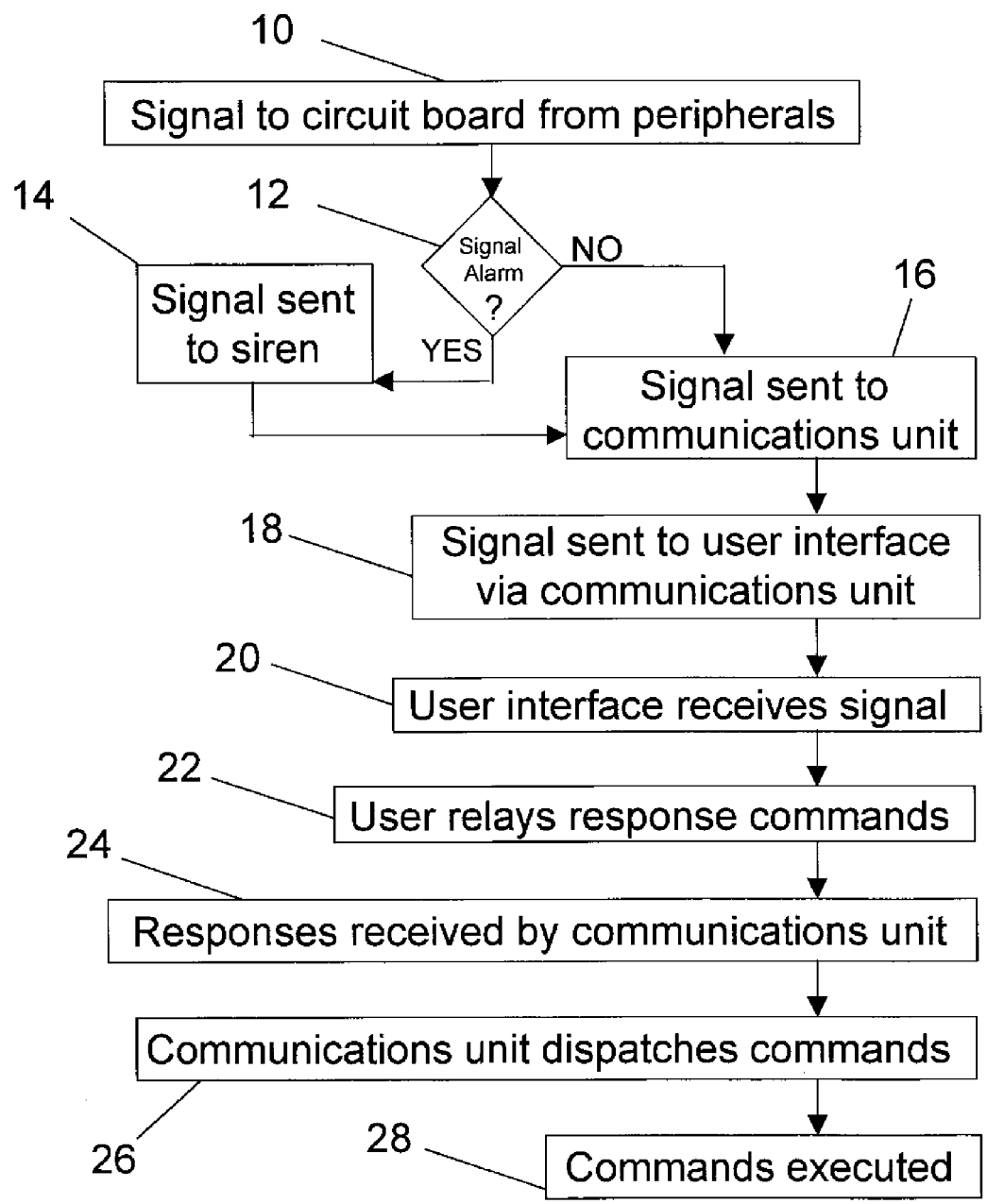
FIG. 1 is a block diagram that shows the major steps of the method disclosed herein.

10 Process step—Signal to circuit board from peripherals
12 Decision step—Signal Alarm
14 Process step—Signal sent to activate alarm
16 Process step—Signal sent to communications unit
18 Process step—Signal sent to user interface via communications unit
20 Process step—User interface receives signal
22 Process step—User relays response commands
24 Process step—Response commands received by communications unit
26 Process step—Communications unit dispatches commands
28 Process step—Commands are executed
30 Low Battery detection means
32 Door proximity detection means
34 Geo-fence breach detection means
36 Position detection means
38 Motion detection means
40 Process step—Signal to user
42 Process step—Signal to activate alarm

DESCRIPTION

The method being disclosed herein is to be implemented by way of a protection unit for use by construction companies in the protection, security and tracking of various mobile storage containers. These containers may range from small, equipment style trailers, to larger hardware storage trailers. Not to be taken as a limiting embodiment, such a protection unit used to execute the process disclosed herein may contain a central circuit board, controlling all operations of said unit, a siren, a communications unit, and an electrical power means.

The primary steps executed by the disclosed method are depicted in FIG. 1. The process commences when the circuit board or central processing means contained within the protection unit receives a signal from one of the envisioned peripherals 10, said signal being of the nature of a breach of some security parameter put in place by the user. Upon this receipt of said signal, the central processing means determines whether the alarm or siren containing in the protection unit is to be sounded 12. If this decision step results in an affirmative response, a signal is sent by the central processing means to sound the siren 14. If this decision step results in a negative response, or after siren has been activated, a signal is sent by the central processing means to the communications unit 16. This unit may be any analog or digital communications means, and is used to relay information to the user from the remote location of the container, typically located on a construction job site. It is at this time when the communications unit will transmit the security signal to the user 18. The user interface will receive the signal 20. This user interface may any interface from a set not limited to, internet based tracking center, or via cellular text message. Once the user receives this warning signal from the communications unit, the users must determine the appropriate response to the incoming message and respond by sending a command, or series of commands back to the protection unit for execution 22. This response from the user is then received by the communications unit 24, and the communications unit subsequently dispatches the commands to the central processing means 26. The command is then executed by the central processing means 28.

There are a series of predetermined commands that may be sent from the user via the internet based tracking center that enable the user to have control over the protection unit, or which may be sent by the user in response to the warning signals coming from the protection unit. The user may command the protection unit to an armed, or a disarmed configuration. A confirmation message is then sent to the user. The user may also command the siren on or off depending on the situation. Additionally, the user may enable or disable a set of warning means on the container, such means may include, but are not limited to include warning lights, sound siren, etc. The user may enable or disable a geo-fence boundary via this internet based tracking center.

Figure 2:
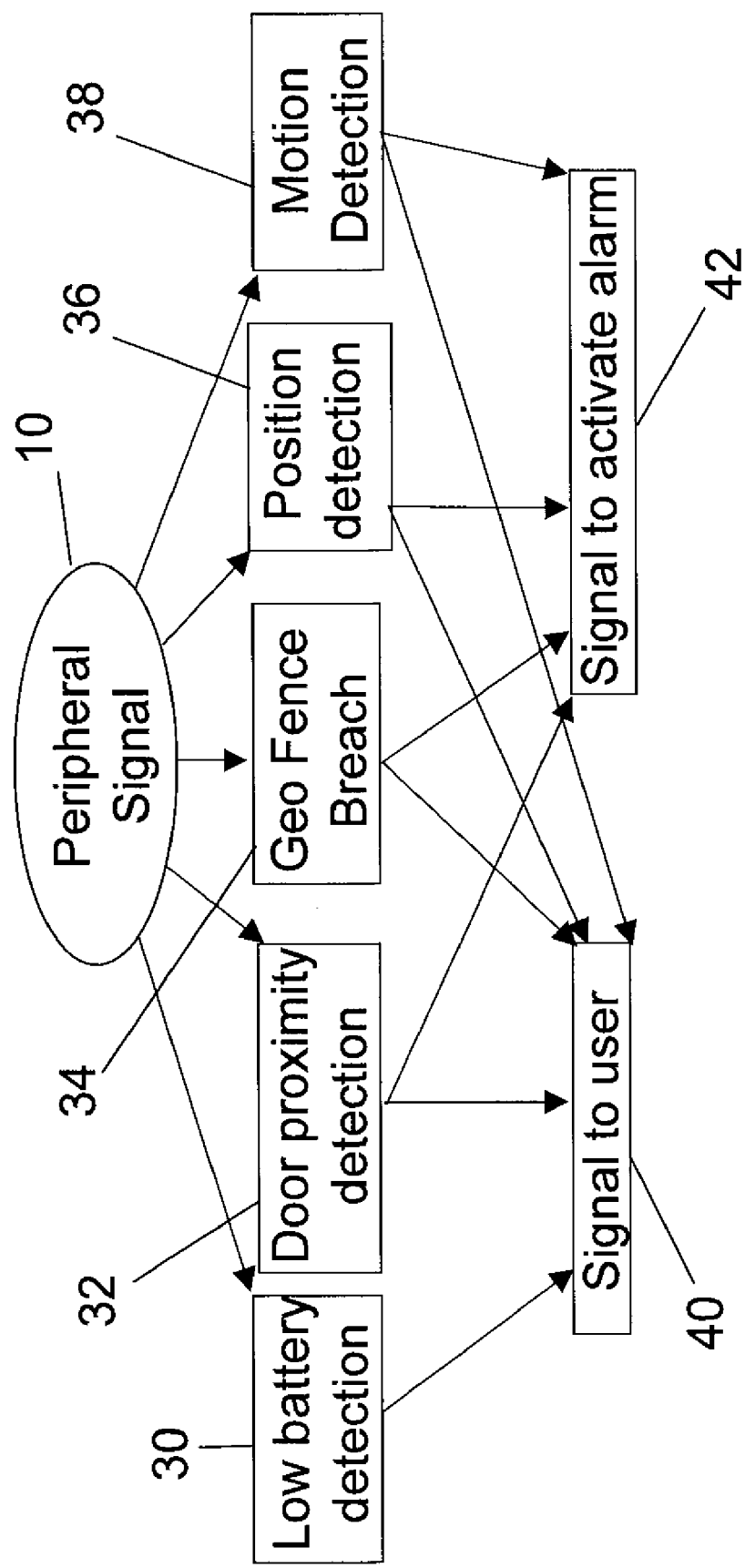
FIG. 2 is a block diagram that details the peripheral signals input to the protection unit and the potential responses to those signals.

FIG. 2 details the various peripheral warning signals that may be received by the central processing means of the protection unit. A low battery detection input signal 30 will be relayed to the central processing means should the battery voltage fall below a predetermined threshold. Upon receipt of this signal, the central processing means will transmit a signal to the user 40 via cellular text message, via internet based tracking center, and to the monitoring system. Upon the recognition of a security ground loop fault, the door proximity detection means will signal the central processing means of a security breach 32. Upon receipt of this signal, the central processing means will transmit a signal to the user 40 via cellular text message, via internet based tracking center, and to the monitoring system. Additionally, the command will be transmitted by the central processing means to activate the siren 42.

The user may pre-define a boundary within which the container must remain. Known as a geo-fence, once this fence is breached, a signal is transmitted by the central processing means to the user 34. The central processing means will transmit the warning signal to the user 40 via cellular text message, via internet based tracking center, and to the monitoring system. Additionally, the command will be transmitted by the central processing means to activate the siren 42.

The protection unit may also be equipped with motion detectors. Upon motion detector activation 38, the central processing means will transmit the warning signal to the user 40 via cellular text message, via internet based tracking center, and to the monitoring system. Additionally, the command will be transmitted by the central processing means to activate the siren 42.

Finally, the protection unit may be equipped with position detection means, such as but not limited to, Global Positioning System locator. The user may access the position of the container via the internet based tracking center. The central processing means with transmit the position detection signal to the internet based tracking center for display to the user 36.

In an alternative embodiment of the disclosed method, the method acts in an asset management capacity, whereby the user takes a more active role in commanding the protection unit. Instead of waiting for the communications unit to contact the user, the user may initiate contact with the protection unit to arm and disarm the protection unit, and setting the geo-fence boundary.

Figure 4:
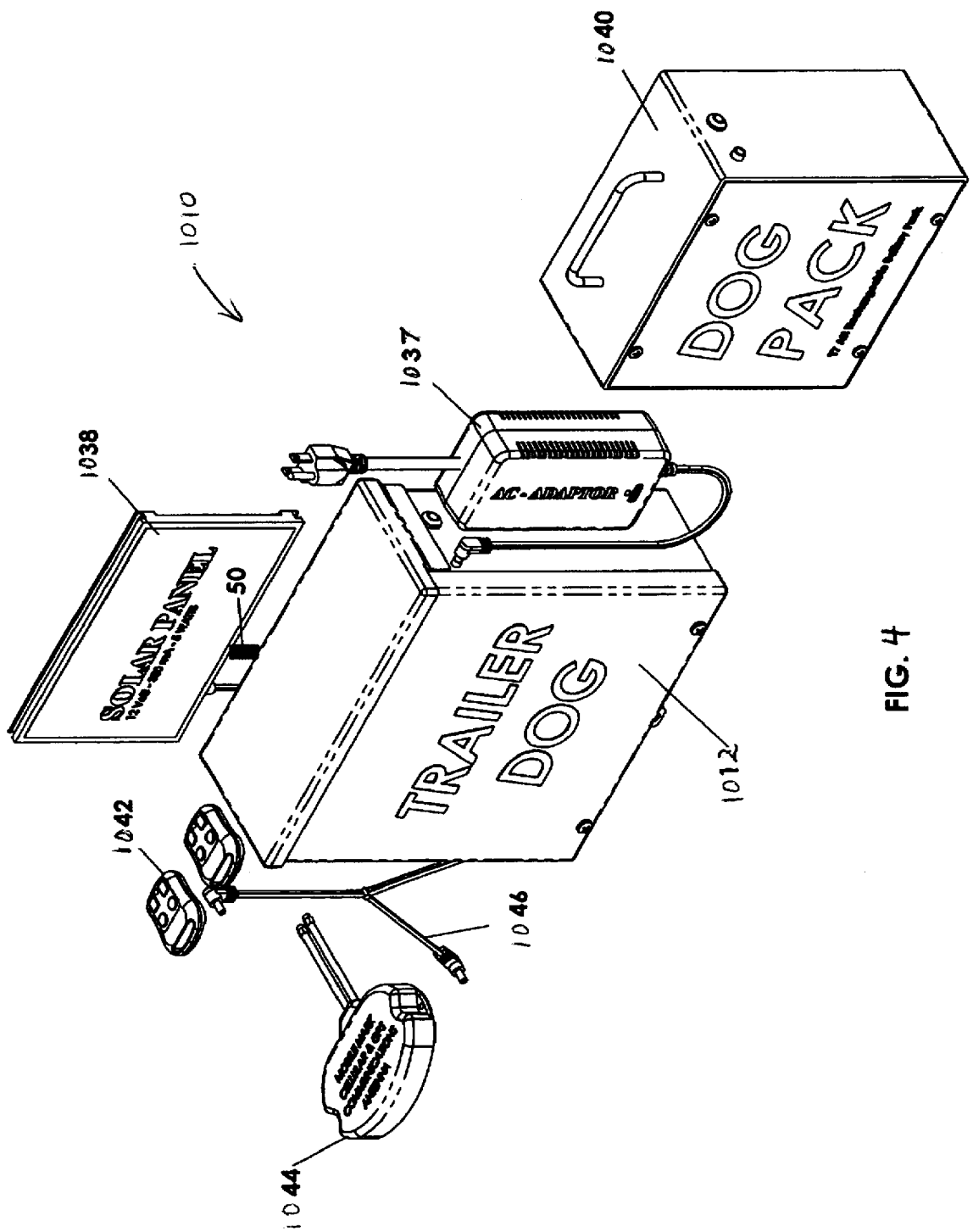
FIG. 4 is a perspective view of an embodiment of the mobile asset protection system with different sources of power.

Referring now to FIGS. 3A-4, a mobile asset protection system comprising a mobile asset protection unit 1010 according to the present invention is disclosed. In this embodiment, the mobile asset protection unit 1010 is housed in an industry standard NEMA 3 electrical enclosure 1012. However, in other embodiments, the mobile asset protection unit may be housed in any other suitable protective enclosure. In this embodiment, the global positioning system locator is a LunarEYE GPS and Cellular Communicator 1014 that serves as a single unit that performs the earlier described GPS location functions and also serves as the earlier described communications unit. Further, a siren 1016 serves as one of the earlier described warning means. In this embodiment, each of the LunarEYE GPS and Cellular Communicator 1014 and the siren 1016 are secured to a mounting panel 1028 that secures them to the enclosure 1012. An internal battery power supply 1018 is also secured within the enclosure 1012, and in this embodiment, is secured to the mounting panel 1028. Further, a specially fabricated PC Interface Board 1022 is secured within the enclosure 1012, and in this embodiment, is secured to the mounting panel 1028. The mounting panel 1028 is affixed to the enclosure 1012 via four mounting panel attachment screws 1052. In this embodiment, the PC Interface Board 1022 is affixed to the mounting panel 1028 via four PC interface board attachment screws 1054. The internal battery power supply 1018 is secured within the enclosure 1012 via a battery support 1020. Further, an LED status indicator 1024 is wired to the PC Interface Board 1022 via an LED status indicator connector 1026. The LED status indicator 1024 is installed through a field wiring access 1036 and mounted on a mobile asset for easy viewing. An LED battery condition indicator 1032 is mounted on the enclosure 1012 adjacent to a power jack 1032 and shows the charge of the internal battery power supply 1018. In this embodiment, if the internal battery power supply 1018 charge falls below 11.5 volts, the LED battery condition indicator 1032 illuminates red instead of green.

FIG. 4 shows the mobile asset protection system, in this embodiment, comprising a solar panel 1038 (5 watt panel) is the primary power source used to charge the internal battery power supply 1018. The solar panel 1038 is connected to the PC Interface Board 1022 using a solar panel connector cable 1050. Additionally, an AC adaptor 1037 is used as a supplemental source of power to charge the internal battery power supply 1018 via the aforementioned power jack 1032. Further, external battery power packs 1040 may be used to extend operations should the internal battery power supply 1018 run out of charge and the solar panel 1038 fail to provide adequate additional charge. In this embodiment, a Y-shaped interconnecting cable 1046 is used to attach the external battery power packs 1040 to the mobile asset protection unit 1010 via the power jack 1032. Key fob remotes 1042 can be used to manually arm and disarm the mobile asset protection unit 1010. Further, a GPS and cellular communications antenna 1044 is mounted on a top of a mobile asset (such as a trailer or storage unit) and is connected directly to the LunarEYE GPS and cellular communicator 1014.

Enclosing the mobile asset protection unit 1010 in the NEMA 3 electrical enclosure 1012 provides protection from external foreign matter, i.e. weather, dust, and ice and further protects all internal components from theft and/or damage. In this embodiment, the PC interface board 1022 provides a two-way interface between the LunarEYE GPS and cellular communicator 1014 and the alarm system 1030. This two-way interface serves to allow the LunarEYE GPS and cellular communicator 1014 the ability to control the alarm system 1030 and the alarm system 1030 can in turn control the LunarEYE GPS and cellular communicator 1014.

In this embodiment, there are three ways to control the mobile asset protection unit 1010: (1) by key fob remote 1042, (2) via cellular phone or, (3) via the internet. The key fob remote 1042 directly accesses the functionality of the alarm system 1030 by sending arm and disarm commands. Alternatively, the arm/disarm command can be sent remotely by the user from any position on the globe via a cellular phone or via the internet. The LunarEYE GPS and cellular communicator 1014 can be commanded to sound the siren 1016 remotely by cellular phone or via the internet. Upon receiving the command, the LunarEYE GPS and cellular communicator 1014 transmits an output signal to the siren 1016. Additionally, after arming the mobile asset protection unit 1010, the user can track the unit on the internet via the positioning capabilities of the LunarEYE GPS and cellular communicator 1014. Finally, the LunarEYE GPS and cellular communicator 1014 can be programmed by the user to set a geo-fence around the unit being protected of a pre-determined radius. The LunarEYE GPS and cellular communicator 1014 uses existing GPS capabilities to alert the user if the unit, or the mobile asset protection unit 1010 has moved outside of that radius. Further, a mercury switch may be installed on the PC interface board to provide feedback through the LunarEYE GPS and cellular communicator 1014 to the user of any vibration or abrupt change of position of the protected mobile asset. After activating the mobile asset protection unit 1010, GPS data is transmitted via the GPS and communications antenna 1044 to a central control station. The user can access this information via the internet from a control station's primary website. As an asset finder, the user can submit a "flash lights" command to the mobile asset protection unit 1010 on a given mobile asset using the internet or a cellular phone to communicate directly with the LunarEYE GPS and cellular communicator 1014. This function serves a two-fold purpose: (1) to allow the user to find a specific mobile asset in a lot full of similar mobile assets, and (2) to draw attention to the unit, e.g. following a theft of the mobile asset. The mobile asset protection unit 1010 may optionally be equipped with a kill relay accessible only from the central control center, where a command is sent to a specific mobile asset protection unit 1010 to shut off all operations. This is useful, for example, in the instance where a user/customer has failed to pay his bill and the monitoring service and/or use of the mobile asset protection unit 1010 is to be discontinued.

What is claimed is:

1. A mobile asset protection system, comprising:
  a housing formed of an industry standard enclosure attached to a mobile asset;
  a protection unit disposed within the housing comprising:
    a control circuit board controlling operations of the protection unit; and
    a communications unit disposed within the protection unit;
  a power supply disposed within the housing for selectively powering at least a portion of the mobile asset protection system;
  a peripheral for selectively providing a peripheral signal;
  an alarm system disposed within the housing and selectively powered by the power supply, the alarm system selectively controlling provision of a warning in response to receiving the peripheral signal.

2. The mobile asset protection system according to claim 1, wherein the peripheral is selected from the group consisting of a low power supply detection device, a door proximity detection device, a geo-fence breach detection device, a position determination device, a motion detection device, and a vibration detection device.

3. The mobile asset protection system according to claim 1, wherein the warning provided is selected from the group consisting of operating a siren, operating a light, activating a geo-fence, communicating a text message, signaling to a monitoring system, signaling to an internet website, communicating with a key fob remote, and communicating with a cellular device.

4. The mobile asset protection system according to claim 1, further comprising:

a global positioning system locator for determining a location of the mobile asset protection system.

5. The mobile asset protection system according to claim 4, wherein the warning provided is in response to the location of the mobile asset protection system as determined by the global positioning system locator.

6. The mobile asset protection system according to claim 1, further comprising:
a cellular communicator that allows remote control of the alarm system.

7. The mobile asset protection system according to claim 1, further comprising:
a cellular communicator that allows remote provision of a warning in response to the alarm system receiving the peripheral signal.

8. The mobile asset protection system according to claim 1, further comprising:
a global positioning system locator for determining a location of the mobile asset protection system; and
a computer interface board provides a two-way interface between the global positioning system locator and the alarm system.

9. The mobile asset protection system according to claim 1, further comprising:
a cellular communicator; and
a computer interface board that provides a two-way interface between the cellular communicator and the alarm system.

10. The mobile asset protection system according to claim 1, wherein the peripheral is a siren disposed within the housing.

11. The mobile asset protection system according to claim 1, further comprising a battery condition indicator.

12. The mobile asset protection system according to claim 1, further comprising a solar panel for selectively powering the mobile asset protection system.

13. The mobile asset protection system according to claim 1, wherein the mobile asset protection system is selectively powered by an alternating current adapter.

14. The mobile asset protection system according to claim 1, further comprising:
a global positioning system locator; and
a cellular communicator;
wherein the global positioning system locator and the cellular communicator are an integrated single device.

15. The mobile asset protection system according to claim 14, further comprising:
a computer interface board that provides a two-way interface between the integrated single device and the alarm system.

* * * * *